(12) United States Patent
Shin et al.

(10) Patent No.: US 9,945,947 B2
(45) Date of Patent: Apr. 17, 2018

(54) METHOD AND APPARATUS FOR GENERATING DEPTH VALUE CORRESPONDING TO SUBJECT USING DEPTH CAMERA

(71) Applicants: Samsung Electronics Co., Ltd., Suwon-si, Gyeonggi-do (KR); THE REGENTS OF THE UNIVERSITY OF MICHIGAN, Ann Arbor, MI (US)

(72) Inventors: Jungsoon Shin, Yongin-si (KR); Keechang Lee, Seongnam-si (KR); Euisik Yoon, Ann Arbor, MI (US); Jihyun Cho, Ann Arbor, MI (US)

(73) Assignees: Samsung Electronics Co., Ltd., Gyeonggi-do (KR); The Regents of the University of Michigan, Ann Arbor, MI (US)

( * ) Notice: Subject to any disclaimer, the term of this patent is extended or adjusted under 35 U.S.C. 154(b) by 352 days.

(21) Appl. No.: 14/728,439

(22) Filed: Jun. 2, 2015

(65) Prior Publication Data
US 2015/0350627 A1    Dec. 3, 2015

(30) Foreign Application Priority Data
Jun. 2, 2014    (KR) .................. 10-2014-0067064

(51) Int. Cl.
*G01S 17/36*    (2006.01)
*H04N 13/02*    (2006.01)
(Continued)

(52) U.S. Cl.
CPC ............ *G01S 17/36* (2013.01); *G01S 7/4914* (2013.01); *G01S 17/89* (2013.01); *H04N 13/0253* (2013.01)

(58) Field of Classification Search
CPC .................................................... G01S 17/36
(Continued)

(56) References Cited

U.S. PATENT DOCUMENTS 7,379,100 B2    5/2008    Gokturk et al.
7,511,801 B1    3/2009    Rafii et al.
(Continued)

FOREIGN PATENT DOCUMENTS

KR    20090067547 A    6/2009
KR    20120112709 A    10/2012

OTHER PUBLICATIONS

Lucio Pancheri et al., "A QVGA-Range Image Sensor Based on Buried-Channel Demodulator Pixels in 0.18µm CMOS with Extended Dynamic Range", 2012, IEEE International Solid-State Circuits Conference, pp. 394-396.
(Continued)

*Primary Examiner* — Jason C Olson
(74) *Attorney, Agent, or Firm* — Harness, Dickey & Pierce, P.L.C.

(57) ABSTRACT

A method and apparatus for generating a depth value corresponding to a subject by using a depth camera includes dividing a predetermined time section into n sub-time sections in order to measure the depth value, acquiring a voltage value corresponding to the amount of light reflected from the subject in each sub-time section, by using at least one photodiode included in the depth camera, quantizing the voltage value to any one level among predetermined levels, on the basis of the acquired n voltage values, and outputting the quantized value.

16 Claims, 8 Drawing Sheets

(51) Int. Cl.
*G01S 17/89* (2006.01)
*G01S 7/491* (2006.01)

(58) Field of Classification Search
USPC .......................................................... 356/4.01
See application file for complete search history.

(56) References Cited

U.S. PATENT DOCUMENTS

| | | | | |
|---|---|---|---|---|
| 2001/0021011 | A1* | 9/2001 | Ono | G06T 7/586 |
| | | | | 356/3 |
| 2001/0052985 | A1* | 12/2001 | Ono | G01S 17/89 |
| | | | | 356/614 |
| 2004/0179748 | A1* | 9/2004 | McDermott | H04N 5/3591 |
| | | | | 382/275 |
| 2012/0162373 | A1 | 6/2012 | Mheen et al. | |
| 2012/0194799 | A1* | 8/2012 | Kamiyama | G01S 7/4816 |
| | | | | 356/5.01 |
| 2012/0200842 | A1* | 8/2012 | Kamiyama | G01B 11/026 |
| | | | | 356/5.03 |
| 2013/0050426 | A1* | 2/2013 | Sarmast | G01S 17/89 |
| | | | | 348/46 |
| 2013/0208257 | A1* | 8/2013 | Dyer | G01S 7/4876 |
| | | | | 356/4.01 |

OTHER PUBLICATIONS

Jihyun Cho et al., A 5.9μm-Pixel 2D/3D Image Sensor with Background Suppresion over 100klx, 2013, Symposium on VLSI Circuits Digest of Technical Papers, pp. C6-C7.

* cited by examiner

FIG. 3A
FIG. 3B
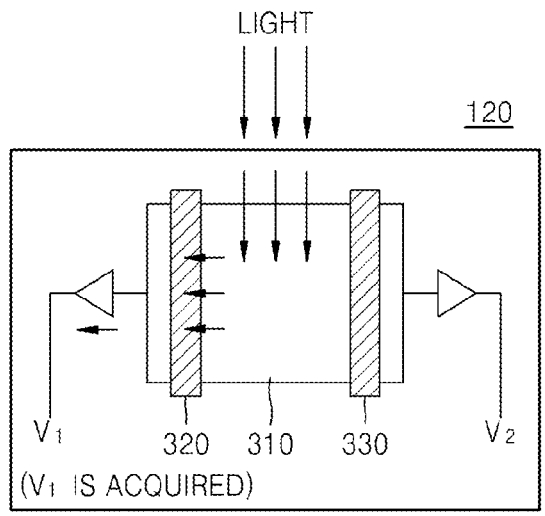
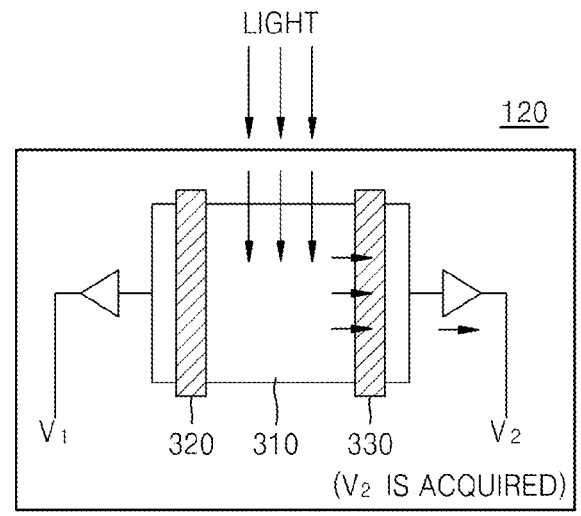
FIG. 3C
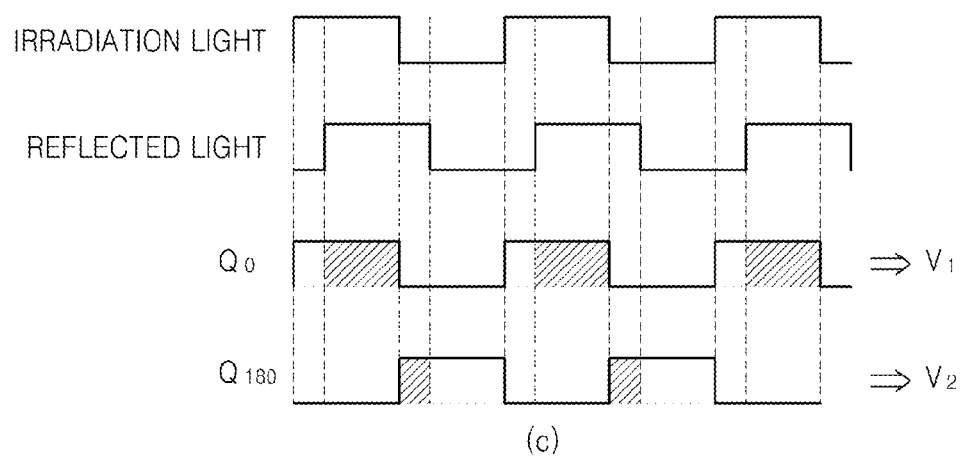

METHOD AND APPARATUS FOR GENERATING DEPTH VALUE CORRESPONDING TO SUBJECT USING DEPTH CAMERA

CROSS-REFERENCE TO RELATED APPLICATIONS

This application claims the benefit of Korean Patent Application No. 10-2014-0067064, filed on Jun. 2, 2014, in the Korean Intellectual Property Office, the disclosure of which is incorporated herein in its entirety by reference.

BACKGROUND

1. Field

The disclosure herein relates to a method and apparatus for generating a depth value corresponding to a subject by using a depth camera.

2. Description of the Related Art

Methods of acquiring a depth image of an object by using a depth camera may include a time-of-flight (ToF) method using a time corresponding to a time at which an object is irradiated with infrared light (IR) and then a time corresponding to a time at which the irradiated infrared light is reflected and returned. A ToF depth camera adopting such a method may acquire a depth of an object in all pixels in real time, as compared with other types of cameras (for example, a stereo camera and a structured light camera) of the related art which acquire a depth image of an object.

SUMMARY

Provided are a method and apparatus for generating a depth value corresponding to a subject by using a depth camera.

Also provided is a computer-readable recording medium (e.g., a non-transitory computer-readable recording medium) having embodied thereon at least one program for executing the method in a computer.

Additional aspects will be set forth in part in the description which follows and, in part, will be apparent from the description, or may be learned by practice of the disclosed embodiments.

According to an aspect of the disclosure, a method of generating a depth value corresponding to a subject by using a depth camera may include dividing a predetermined time section into n sub-time sections in order to measure the depth value, acquiring a voltage value corresponding to the amount of light reflected from the subject in each sub-time section, by using at least one photodiode comprised in the depth camera, quantizing the voltage value to any one level among predetermined levels, on the basis of the acquired n voltage values, and outputting the quantized value.

The method may further include determining whether the photodiode is saturated in each of the sub-time sections, according to whether the acquired voltage value exceeds a predetermined voltage value.

The method may further include initializing the voltage value of the photodiode on the basis of a result of the determination.

The method may further include storing the voltage values of the photodiode which are acquired in the respective sub-time sections.

The method may further include generating a representative voltage which is a voltage value corresponding to a highest level among the predetermined levels, by using the stored voltage values, wherein the quantizing of the voltage value may include quantizing the acquired voltage value to the predetermined level, by using the generated representative voltage.

The storing of the voltage values may include storing a difference value between the acquired voltage value and the initialized voltage value of the photodiode. The voltage value may include at least one of a first voltage value and a second voltage value which correspond to two respective terminals of the photodiode, and the acquiring of the voltage value may include acquiring at least one of the first voltage value and the second voltage value in each of the sub-time sections. The acquiring of the voltage value may include acquiring the first voltage value and the second voltage value in each sub-time section with a phase difference of 180 degrees between each sub-time section and/or each voltage value.

According to an aspect of the disclosure, an apparatus for generating a depth value corresponding to a subject by using a depth camera may include a division unit (division calculator) for dividing a predetermined time section in order to measure the depth value, into n sub-time sections, an acquisition unit (voltage acquirer) for acquiring a voltage value corresponding to the amount of light reflected from the subject in each sub-time section, by using at least one photodiode comprised in the depth camera, a quantization unit (quantizer) for quantizing the voltage value to any one level among predetermined levels on the basis of the acquired n voltage values, and an output unit (output device) for outputting the quantized value.

The apparatus may further include a determination unit (comparator) to determine whether the photodiode is saturated in each of the sub-time sections, according to whether the acquired voltage value exceeds a predetermined voltage value. The comparator may initialize the voltage value of the photodiode on the basis of a result of the determination.

The apparatus may further include a storage to store the voltage values of the photodiode which are acquired in the respective sub-time sections.

The apparatus may further include a representative voltage generation unit (generator) to generate a representative voltage which is a voltage value corresponding to a highest level among the predetermined levels, by using the stored voltage values, wherein the quantizer may quantize the acquired voltage value to the predetermined level, by using the generated representative voltage.

The storage may store a difference value between the acquired voltage value and the initialized voltage value of the photodiode.

The voltage value obtained by the voltage acquirer may include at least one of a first voltage value and a second voltage value which correspond to two respective terminals of the photodiode, and the voltage acquirer may acquire at least one of the first voltage value and the second voltage value in each of the sub-time sections. The voltage acquirer may acquire the first voltage value and the second voltage value in each sub-time section with a phase difference of 180 degrees between each sub-time section and/or each voltage value.

The photodiode may include a pinned-photodiode (PPD).

18. A non-transitory computer readable recording medium having embodied thereon one or more computer programs, that when implemented, executes the method of claim 1.

According to an aspect of the disclosure, provided is a computer readable recording medium (e.g., a non-transitory computer readable recording medium) having embodied thereon at least one computer program for executing the method. That is, a non-transitory computer readable recording medium may have embodied thereon one or more computer programs, that when implemented, executes any of the methods disclosed herein.

According to an aspect of the disclosure, provided is a method of generating a depth value using a depth camera which includes a photodiode, the method including: dividing a predetermined time section into n sub-time sections based on an amount of light capable of being received by the photodiode, obtaining, using the photodiode, a first voltage value corresponding to an amount of light reflected from an object in a first sub-time section, among the n sub-time sections, obtaining, using the photodiode, a second voltage value corresponding to a total amount of light reflected from the object in the first sub-time section and in a second sub-time section, among the n sub-time sections, determining whether the obtained second voltage value is equal to or exceeds a saturation voltage, and initializing a charge amount accumulated in the photodiode when the obtained second voltage value is equal to or exceeds the saturation voltage.

The method may further include storing a number of times that the charge amount accumulated in the photodiode is initialized.

The amount of the light that the photodiode is capable of receiving in a single sub-time section may be less than a total amount of light that the photodiode is capable of receiving before being saturated.

A voltage value may be obtained for each of the n sub-time sections, and the method may further include storing a charge amount corresponding to the obtained voltage values for the n sub-time sections.

The method may further include defining a first range of voltage values including a predetermined number of levels, wherein a first maximum voltage value among the first range of voltage values corresponds to a highest level among the predetermined number of levels in the first range of voltage values, classifying a voltage value corresponding to the stored charge amount to one of the predetermined number of levels in the first range of voltage values, setting a representative voltage based on the classifying, defining a second range of voltage values including the predetermined number of levels, wherein the representative voltage among the second range of voltage values corresponds to a highest level among the predetermined number of levels in the second range of voltage values, and quantizing the voltage value corresponding to the stored charge amount to one of the predetermined levels in the second range of voltage values.

BRIEF DESCRIPTION OF THE DRAWINGS

These and/or other aspects will become apparent and more readily appreciated from the following description of the embodiments, taken in conjunction with the accompanying drawings in which:

FIGS. 3A to 3C are diagrams illustrating an example in which an acquisition unit operates, according to an embodiment of the disclosure;

DETAILED DESCRIPTION

Figure 1:
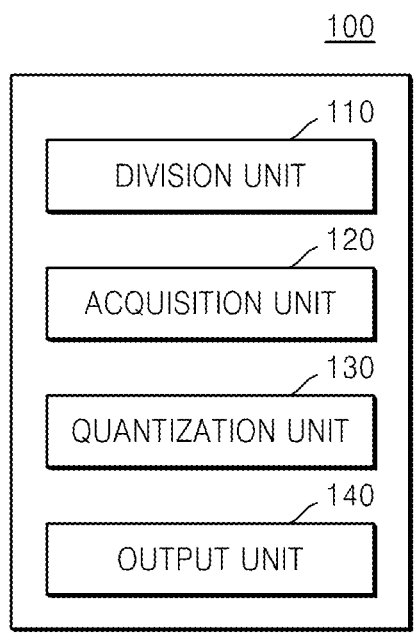
FIG. 1 is a configuration diagram showing an example of an apparatus for generating a depth value according to an embodiment of the disclosure.

Reference will now be made in detail to embodiments, examples of which are illustrated in the accompanying drawings, wherein like reference numerals refer to like elements throughout. In this regard, the disclosed embodiments may have different forms and should not be construed as being limited to the descriptions set forth herein. Accordingly, the example embodiments are merely described below, by referring to the figures, to explain aspects of the disclosure.

Unless otherwise noted, the term "comprise" or variations such as "comprises" or "comprising" is understood to mean "includes, but is not limited to" so that other elements that are not explicitly mentioned may also be included. Also, the term "unit" may be configured as software, or may be configured as hardware, such as a Field Programmable Gate Array (FPGA) or Application Specific Integrated Circuit (ASIC). However, the term "unit" may be configured to be included in a storage medium capable of being addressed, or may be configured to reproduce or reside on one or more processors. Therefore, the term "unit" as an example may include components such as software components, object-oriented software components, class components, and task components, processes, functions, properties, procedures, subroutines, segments of a program code, drivers, firmware, microcodes, circuits, data, a database, data structures, tables, arrays, and variables. Functions provided within the components and the "unit" may be combined with a less number of components and "units", or may be divided into additional components and "units". Expressions such as "at least one of," when preceding a list of elements, modify the entire list of elements and do not modify the individual elements of the list.

FIG. 1 is a configuration diagram showing an example of an apparatus 100 for generating a depth value according to an embodiment of the disclosure. The apparatus 100 for generating a depth value may include a division unit 110, an acquisition unit 120, a quantization unit 130, and an output unit 140.

The division unit 110 may divide a predetermined time section in order to measure a depth value, into n sub-time sections. Here, n is a predetermined natural number (e.g., a counting number greater than zero). In addition, the division unit 110 may change "n" on the basis of a signal (e.g., a signal which is input by a user). The predetermined time section for measuring a depth value refers to a time section between a point in time when the acquisition unit 120 to be described later acquires reflected light and a point in time when the output unit 130 to be described later outputs the depth value. The sub-time sections refer to n time sections having the same length which are divided from one time section which is set in order to measure a depth value. The number of sub-time sections may be two, three, or more than three sections and may be set by a user as desired. A detailed description related to the division unit 110 will be given below with reference to FIG. 2.

Figure 2:
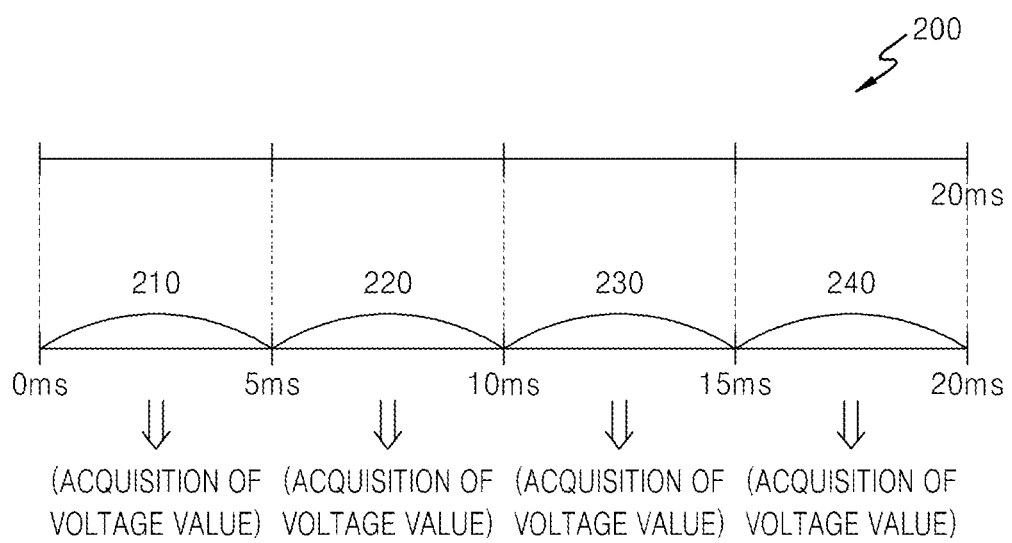
FIG. 2 is a diagram illustrating an example in which a division unit operates, according to an embodiment of the disclosure.

FIG. 2 is a diagram illustrating an example in which the division unit 110 operates, according to an embodiment of the disclosure. The division unit 110 may divide a predetermined time section 200 into n sub-time sections in order to measure a depth value. For example, as shown in FIG. 2, there are four sub-time sections 210, 220, 230 and 240 which may be used to measure a depth value. The acquisition unit 120, which will be described later with reference to FIG. 1, may acquire a voltage value corresponding to the amount of light reflected from a subject with respect to each of the n sub-time sections, by using a photodiode. For example, when the predetermined time section 200 for measuring a depth value is 20 ms and the set time section is divided into four sub-time sections 210, 220, 230 and 240, each of the four sub-time sections may correspond to 5 ms. That is, the length or duration of each sub-time section may be equal to one another, although the disclosure is not so limited and the sub-time sections could have different lengths from one another. The acquisition unit 120 may acquire a voltage value corresponding to the amount of light reflected from a subject with respect to each of the four sub-time sections, by using the photodiode.

The amount of light capable of being accommodated in the photodiode is limited. For example, it may be assumed in an example embodiment that the total amount of light capable of being accommodated in the photodiode is 100 lumen (lm), the set time section is 20 ms, and the amount of light incident on the photodiode with the same light intensity for a set period of time is 200 lumen (lm). The amount of light accommodated in (or received by) the photodiode during 20 ms is 200 lumen (lm), but the photodiode accommodates only a charge amount corresponding to 100 lumen (lm). This is because the total amount of light capable of being accommodated in (received by) the photodiode is limited to 100 lumen (lm). The acquisition unit 120 may acquire a voltage value corresponding to a charge amount which corresponds to 100 lumen (lm) accommodated in the photodiode. However, such a voltage value would not accurately indicate actual amount of light incident on the photodiode (e.g., a voltage value corresponding to 200 lumen (lm)).

When 20 ms, which is a time section set by the division unit 110 according to an embodiment of the disclosure, is divided into four sub-time sections each of which is 5 ms, the photodiode may receive the amount of light of 50 lumen (lm) in the first sub-time section 210. In the second sub-time section 220, the photodiode may receive the amount of light of a total of 100 lumen (lm) including the amount of light which was previously received (that is, 50 lumen (lm) being received in the first 5 ms, and another 50 lumen (lm) being received from the time period of 5 ms to 10 ms). The photodiode may accumulate a charge amount in response to the received amount of light.

A determination unit 400, which will be described later with reference to FIG. 1, may determine whether a voltage value of the photodiode reaches a voltage value (that is, a saturation voltage value of the photodiode) which corresponds to the charge amount accumulated with the amount of light of 100 lumen (lm). When the determination unit 400 determines that the voltage value of the photodiode reaches the saturation voltage value, the determination unit 400 may initialize the charge amount accumulated in the photodiode.

A storage unit 410, which will be described later with reference to FIG. 1, may store the number of times when the charge amount accumulated in the photodiode is initialized. Alternatively, or additionally, the storage unit 410 may store a voltage value corresponding to the amount of light which is received in the photodiode. The acquisition unit 120 may receive light again at the same time when the storage unit 410 stores the number of initializations or the voltage value. In the third sub-time section 230, e.g., from 10 to 15 ms, the photodiode may receive again the amount of light of 50 lumen (lm). In the fourth sub-time section 240, e.g., from 15 ms to 20 ms, the photodiode may receive the amount of light of a total of 100 lumen (lm) including the amount of light which was previously received. After passing through the fourth sub-time sections 240, the acquisition unit 120 may acquire a voltage value corresponding to the amount of light of 200 lumen (lm) by applying or referring to the stored voltage value or the number of times when the photodiode is initialized. For example, if the number of initializations corresponds to two, it may be determined that 200 lumen (lm) was received by the photodiode (two times 100 lumen (lm)). For example, the stored voltage values may be added together to determine a total voltage value, and the total voltage value may corresponds to an amount of light received.

Accordingly, a dynamic range of the apparatus 100 for forming a depth value by dividing the set time section into n sub-time sections by the division unit 110 may be expanded. Here, the dynamic range refers to widths of a minimum amount of light and a maximum amount of light which are capable of being received by the apparatus 100 for forming a depth value. Since the maximum amount of light capable of being received by dividing the set time section into four sub-time sections by the division unit 110 increases from 100 lumen (lm) to 200 lumen (lm), the dynamic range of the apparatus 100 for generating a depth value is expanded.

Referring back to FIG. 1, the acquisition unit 120 may acquire a voltage value corresponding to the amount of light reflected from a subject in each sub-time section, by using at least one photodiode included in a depth camera. Although not shown in FIG. 1, the apparatus 100 for generating a depth value further may include a light irradiation unit (not shown) and a lens unit (not shown). The light irradiation unit (not shown) may irradiate a subject with infrared light. The lens unit (not shown) may acquire light incident on the apparatus 100 for generating a depth value. Specifically, the lens unit (not shown) may acquire light reflected from the subject. The acquisition unit 120 may be constituted by a photodiode array or a photogate array which is capable of converting reflected light into charge. Here, the photodiode may be a pinned-photodiode (PPD), but is not limited thereto. A detailed description related to the acquisition unit 120 will be given with reference to FIGS. 3A to 3C.

FIGS. 3A to 3C are diagrams illustrating an example in which the acquisition unit operates, according to an embodiment of the disclosure. Referring to FIGS. 3A and 3B, light reflected from a subject is incident on a photodiode 310 within the acquisition unit 120. The photodiode 310 may include a first terminal 320 and a second terminal 330. The first terminal 320 or the second terminal 330 of the photodiode 310 may accumulate a charge amount corresponding to the amount of incident light. For example, the activation and the deactivation of the first terminal 320 or the second terminal 330 may be repeated with a certain cycle time. In other words, when the first terminal 320 is activated, the second terminal 330 is deactivated. When the first terminal 320 is deactivated, the second terminal 330 is activated. While the first terminal 320 is activated, a charge amount corresponding to the amount of incident light may be accumulated in the first terminal 320. While the first terminal 320 is deactivated, a charge amount corresponding to the amount of incident light may not be accumulated in the first terminal 320. While the second terminal 330 is activated, a charge amount corresponding to the amount of incident light may be accumulated in the second terminal 330. While the second terminal 330 is deactivated, a charge amount corresponding to the amount of incident light may not be accumulated in the second terminal 330.

The acquisition unit 120 may acquire voltage values corresponding to the charge amounts which are accumulated in the two respective terminals of the photodiode. The acquisition unit 120 may acquire a first voltage value $V_1$ in the first terminal 320 among the two terminals of the photodiode 310. The acquisition unit 120 may acquire a second voltage value $V_2$ in the second terminal 330 among the two terminals of the photodiode 310.

Referring to FIG. 3C, "irradiation light" refers to light with which a subject is irradiated from a light irradiation unit (not shown). In addition, "reflected light" refers to the "irradiation light" reflected from the subject. There is a certain phase difference between the "irradiation light" and the "reflected light". In other words, since it takes time for the "irradiation light" to be propagated toward the subject or object and it takes time for the "reflected light" to be propagated toward a lens unit (not shown), a point in time when the subject is irradiated with the "irradiation light" from the light irradiation unit (not shown) is earlier by a certain period of time than a point in time when the "reflected light" reaches the lens unit (not shown).

In FIG. 3C, Q0 refers to a case where the first terminal 320 of the photodiode 310 is operated in the same manner as for the time when the "irradiation light" is irradiated, and Q180 refers to a case where the second terminal 330 of the photodiode 310 is operated so as to have a phase difference by 180 degrees from the first terminal 320. In addition, a section in which Q0 shows High refers to a section in which the first terminal 320 is activated, and a section in which Q180 shows High refers to a section in which the second terminal 330 is activated. A section in which Q0 shows Low refers to a section in which the first terminal 320 is deactivated, and a section in which Q180 shows Low refers to a section in which the second terminal 330 is deactivated.

The acquisition unit 120 may repeatedly activate or deactivate the first terminal 320 in the same manner as in the section in which the "irradiation light" is irradiated, and may acquire "reflected light" which is incident during the section in which the first terminal 320 is activated. In addition, the acquisition unit 120 may repeatedly activate or deactivate the second terminal 330 so as to have a phase difference by 180 degrees from the first terminal 320, and may acquire "reflected light" which is incident during the section in which the second terminal 330 is activated.

Referring back to FIG. 1, the quantization unit 130 may quantize a voltage value to any one level among predetermined levels, on the basis of n voltage values acquired. The quantization refers to the classification of continuous amounts of charge (for example, a voltage value) without discontinuity into a finite number of levels (for example, level 1, level 2, and the like which are predetermined levels) which change discontinuously in a fixed width, and the giving of a fixed value to each level (for example, level 1 is given 1 mV, level 2 is given 2 mV, and the like). The quantization unit 130 may classify all voltage values within a range belonging to a specific level as the same levels in accordance with predetermined levels to thereby quantize voltage values. For example, when a minimum voltage value is 0 V, a maximum voltage value is 1 V, and a total of 1000 quantization levels are set, the quantization unit 130 may classify all voltage values between 0 V and 1 mV as level 1 and classifies all voltage values between 1 mV and 2 mV as level 2, and so on, to thereby quantize the voltage values.

Referring back to FIG. 1, the output unit 140 may output the quantized values. The output quantized values may be output to a user (e.g., via a display), or to another component or unit. For example, the quantized values may be output to a depth value calculator which calculates a depth value based on the output quantized value. That is, a depth value for a subject may be generated by using the output voltage values. In addition, a depth image for a subject may be generated by using the generated depth value.

Figure 4:
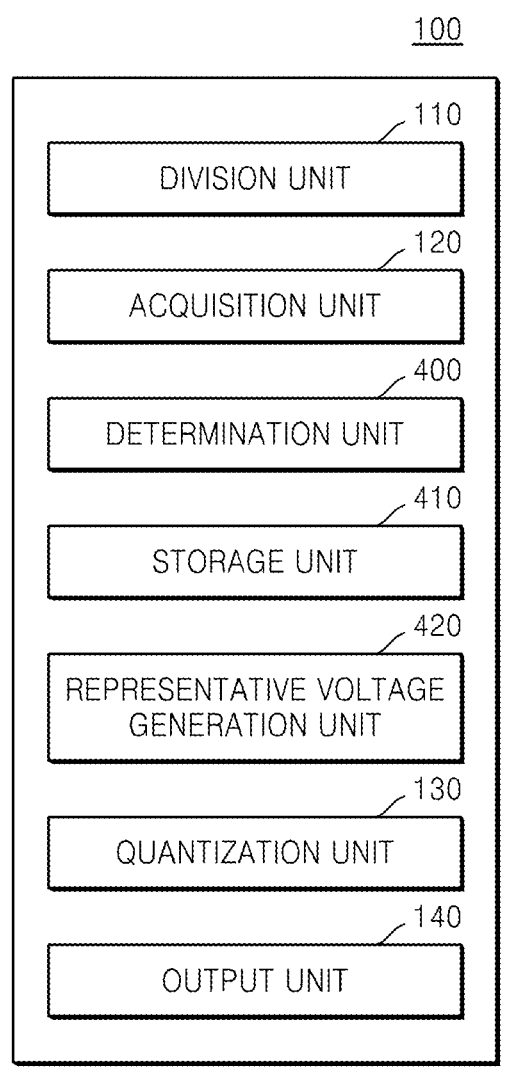
FIG. 4 is a configuration diagram showing an example of an apparatus for generating a depth value according to an embodiment of the disclosure.

FIG. 4 is a configuration diagram showing an example of an apparatus for generating a depth value, according to an embodiment of the disclosure. The apparatus 100 for generating a depth value may include the division unit 110, the acquisition unit 120, the determination unit 400, the storage unit 410, the representative voltage generation unit 420, the quantization unit 130, and the output unit 140. The division unit 110, the acquisition unit 120, and the output unit 140 shown in FIG. 4 operate in the above-described manner with reference to FIG. 1 to FIGS. 3A to 3C. Thus, a detailed description related to the division unit 110, the acquisition unit 120, and the output unit 140 will be omitted here.

The determination unit 400 may determine whether the photodiode 310 is saturated in each sub-time section, according to whether an acquired voltage value exceeds a voltage value obtained when the photodiode 310 is saturated. The determination unit 400 may initialize the voltage value of the photodiode 310 on the basis of a result of the determination result. The voltage value obtained when the photodiode 310 is saturated is a voltage value corresponding to a charge amount accumulated in the photodiode 310 when the photodiode 310 receives a maximum amount of light capable of being accommodated in the photodiode 310. When the voltage value corresponding to the charge amount accumulated in the photodiode 310 exceeds or is equal to the voltage value obtained when the photodiode 310 is saturated, the determination unit 400 may initialize the charge amount accumulated in the photodiode 310 to thereby initialize the voltage value of the photodiode 310. A detailed description related to the determination unit 400 will be given with reference to FIGS. 5A to 5C.

Figure 5A:
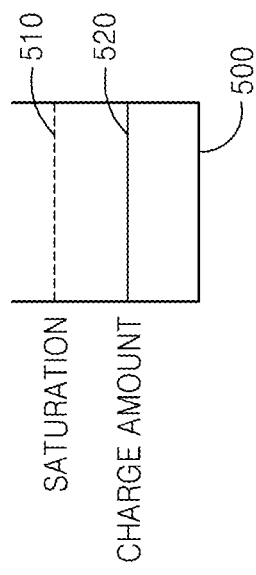
FIGS. 5A to 5C are diagrams illustrating an example in which a determination unit operates, according to an embodiment of the disclosure.
Figure 5B:
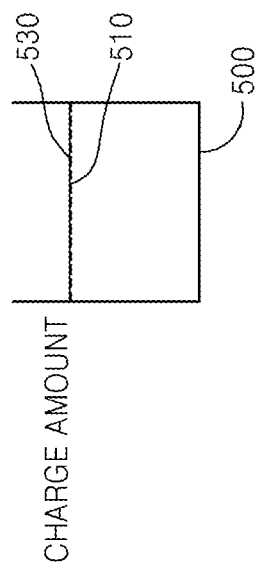
Figure 5C:
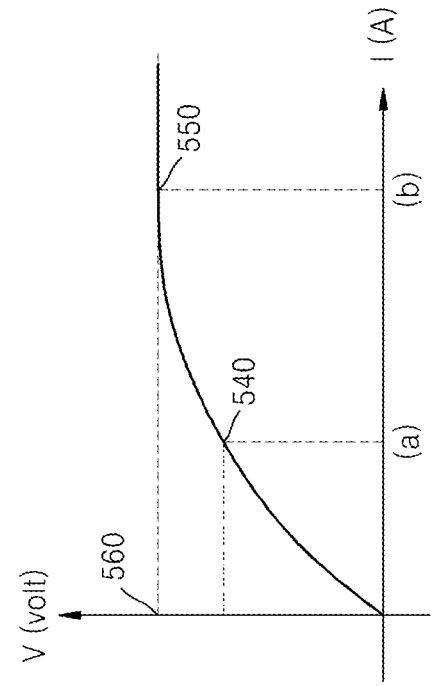

FIGS. 5A to 5C are diagrams illustrating an example in which the determination unit operates, according to an embodiment of the disclosure.

FIG. 5A shows a charge amount 520 accumulated in a terminal 500 of the photodiode 310 and a charge amount 510 accumulated in the terminal 500 in a saturated state. Referring back to FIG. 5A, the charge amount 520 accumulated in the terminal 500 is smaller than the charge amount 510 accumulated in the terminal 500 in a saturated state.

FIG. 5B shows a charge amount 530 accumulated in the terminal 500 of the photodiode 310 and the charge amount 510 accumulated in the terminal 500 in a saturated state. Referring to FIG. 5B, the charge amount 510 accumulated in the terminal 500 in a saturated state is the same as the charge amount 530 accumulated in the terminal 500.

Referring to FIG. 5C, a relationship between a charge amount accumulated in the terminal 500 and a voltage is shown. Since a voltage value 540, which is acquired by the acquisition unit 120 in response to the charge amount 520 accumulated in the terminal 500 shown in FIG. 5A, does not exceed a voltage value 560 corresponding to the charge amount 510 accumulated in the terminal 500 in a saturated state, the determination unit 400 determines that the photodiode 310 is not saturated. Since a voltage value 550, which is acquired by the acquisition unit 120 in response to the charge amount 520 accumulated in the terminal 500 shown in FIG. 5B, is the same as the voltage value 560 corresponding to the charge amount 510 accumulated in the terminal 500 in a saturated state, the determination unit 400 determines that the photodiode 310 is saturated. When it is determined that the photodiode 310 is saturated, the determination unit 400 initializes the charge amount accumulated in the terminal 500 of the photodiode 310 to thereby initialize the voltage value of the terminal of the photodiode 310.

Referring back to FIG. 4, the storage unit 410 may store the voltage value of the photodiode 310 which is acquired in each sub-time section. The storage unit 410 may accumulate and may store the charge amount corresponding to the voltage value of the photodiode 310 in a capacitor. The storage unit 410 may store a difference value between the acquired voltage value and the initialized voltage value of the photodiode. This is for the purpose of reducing an error occurring when the initialized voltage value of the photodiode is not 0 V.

The representative voltage generation unit 420 may generate a representative voltage which is a voltage value corresponding to the highest level among predetermined levels by using the stored voltage values. The predetermined levels refer to levels corresponding to the voltage value obtained when the quantization unit 130 performs quantization. For example, when the quantization unit 130 classifies voltage values between 0 V and 2 V as 100 levels, the 100 levels are referred to as predetermined levels. A user may arbitrarily change the number of levels or a voltage value corresponding to each level. The voltage value corresponding to the highest level among the predetermined levels is the highest voltage value among voltage values within a range belonging to the highest level. For example, the number of predetermined levels may be 100 in total. When the 100 levels are levels corresponding to voltage values between 0 V and 2 V, the highest level is level 100 and a voltage value corresponding to the highest level among the predetermined levels is 2V, and thus a representative voltage is 2 V. A detailed description related to a relationship between the representative voltage generation unit 420 and the quantization unit 130 will be given with reference to FIGS. 6A and 6B.

Figure 6A:
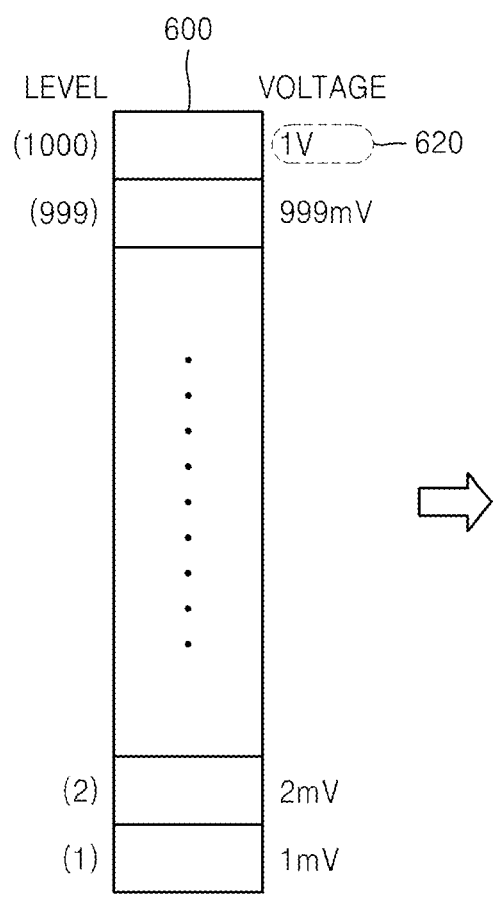
FIGS. 6A and 6B are diagrams illustrating an example in which a representative voltage generation unit and a quantization unit operate, according to an embodiment of the disclosure.
Figure 6B:
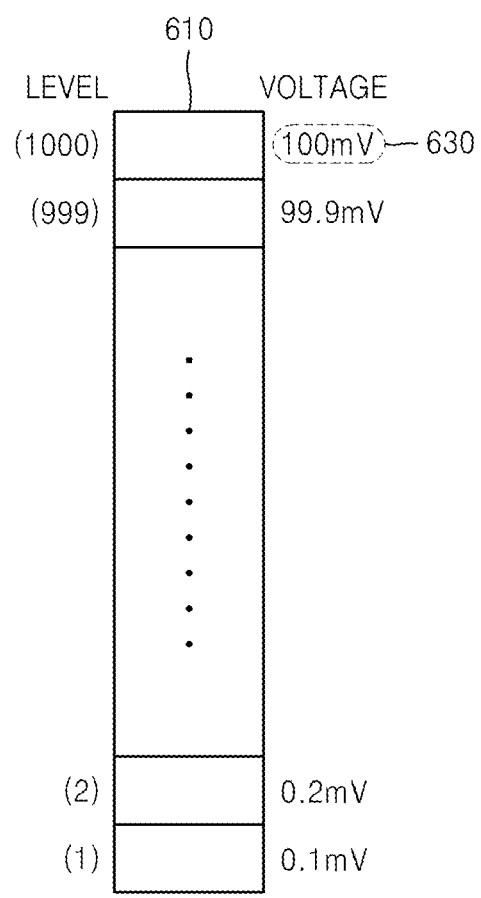

FIGS. 6A and 6B are diagrams illustrating an example in which the representative voltage generation unit 130 and the quantization unit 130 operate, according to an embodiment of the disclosure.

The representative voltage generation unit 420 may generate the representative voltage which is a voltage value corresponding to the highest level among the predetermined levels, by using the stored voltage values. The quantization unit 130 may quantize the acquired voltage value at the predetermined level, by using the generated representative voltage. The representative voltage generation unit 420 may generate the representative voltage by using the stored voltage value or the acquired voltage value.

Referring to an example quantization classification table 600 of FIG. 6A, the quantization unit 130 classifies voltage values between 0 V and 1 V as 1000 levels. Referring to FIG. 6A, 1 V is a maximum voltage 620 capable of being classified by the quantization unit 130. A voltage value larger than 1 V is classified as level 1000 which is the same as 1 V. The levels are classified in units of 1 mV. For example, a voltage value between 0 V and 1 mV is set to level 1, and a voltage value between 1 mV and 2 mV is set to level 2, and so on.

FIG. 6B shows a quantization classification table 610 in which a maximum voltage capable of being classified by the quantization unit 130 is changed to a representative voltage 630. The quantization unit 130 may reduce the occurrence of a quantization error by changing the maximum voltage to the representative voltage 630. For example, when a voltage value is 55.4 mV in FIG. 6A, the voltage value is located between 55 mV and 56 mV, and thus the quantization unit 130 classifies the voltage value as level 56. Since voltage values between 55 mV and 56 mV are classified as the same level in level 56, a voltage value of 55.4 mV generates a quantization error of up to a maximum of 0.6 mV. Referring to FIG. 6B, when a voltage value is 55.4 mV, the quantization unit 130 sets a representative voltage to 100 mV. The quantization unit 130 sets a representative voltage for each voltage value according to a user's input. Referring to the classification table 610 to which the representative voltage is applied, the quantization unit 130 classifies values between 0 V and 100 mV as 1000 levels, and thus the levels are classified in units of 0.1 mV. The quantization unit 130 classifies a voltage value of 55.4 mV as level 554. When voltage values are in a range from 55.3 mV to 55.4 mV, the quantization unit 130 classifies the voltage values as the same level. Thus, when the voltage value is 55.4 mV, a quantization error of up to a maximum of 0.1 mV occurs. Accordingly, a quantization error of up to a maximum of 0.6 mV occurs before the quantization unit 130 uses the representative voltage. Since the quantization error of up to a maximum of 0.1 mV occurs by using the representative voltage, the occurrence of the quantization error is reduced by using the representative voltage.

Figure 7:
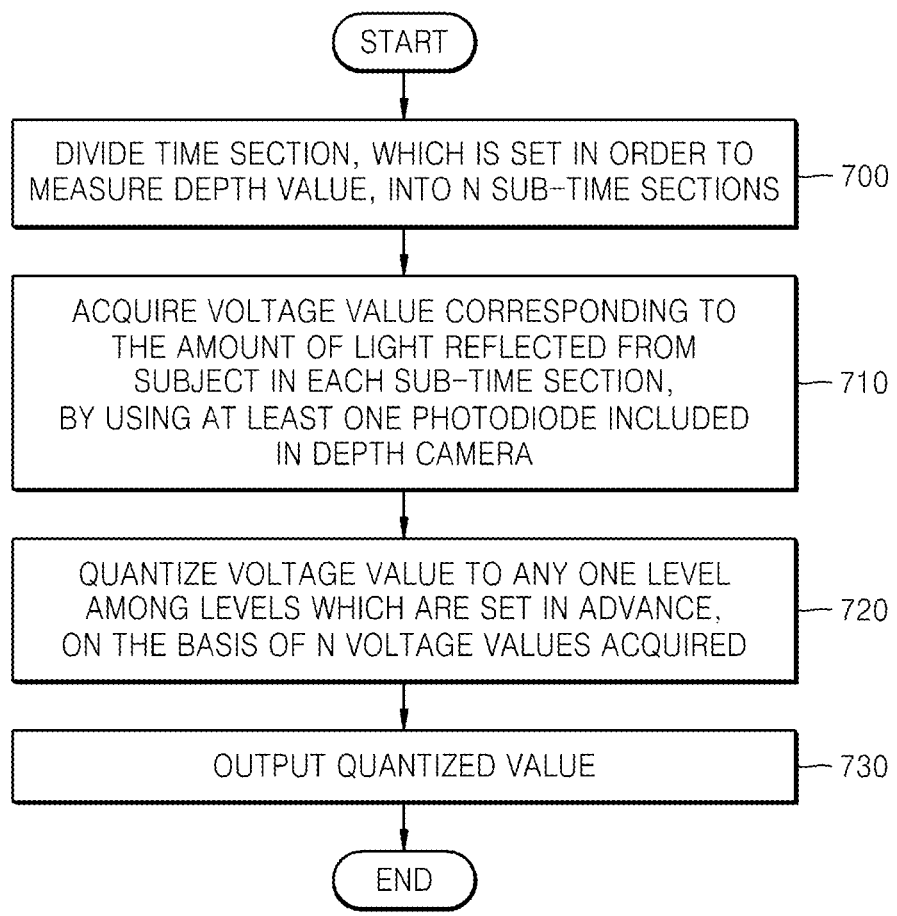
FIG. 7 is a flowchart showing an example of a method of generating a depth value according to an embodiment of the disclosure.

FIG. 7 is a flowchart showing an example of a method of generating a depth value, according to an embodiment of the disclosure. Referring to FIG. 7, the method of generating a depth value may be constituted by operations which are processed in a time-series manner by the apparatus 100 for generating a depth value which is shown in FIG. 1. Therefore, if the description below omits one or more details for the sake of brevity, it may be understood that the description of the apparatus 100 for generating a depth value which is shown in FIG. 1 may also be applied to the method of generating a depth value of FIG. 7.

In operation 700, the division unit 110 may divide a time section, which is set in order to measure a depth value, into n sub-time sections.

In operation 710, the acquisition unit 120 may acquire a voltage value corresponding to the amount of light reflected from a subject in each sub-time section, by using at least one photodiode included in a depth camera. The voltage value may include at least one of a first voltage value and a second voltage value which correspond to two respective terminals of the photodiode. The acquisition unit 120 may acquire at least one of the first voltage value and the second voltage value in each sub-time section. The acquisition unit 120 may acquire the first voltage value and the second voltage value in each sub-time section with a phase difference of 180 degrees therebetween. In operation 720, the quantization unit 130 may quantize a voltage value to any one level among predetermined levels, on the basis of n voltage values acquired.

In operation 730, the output unit 140 may output the quantized value, which may be used to obtain a depth value of an object.

Figure 8:
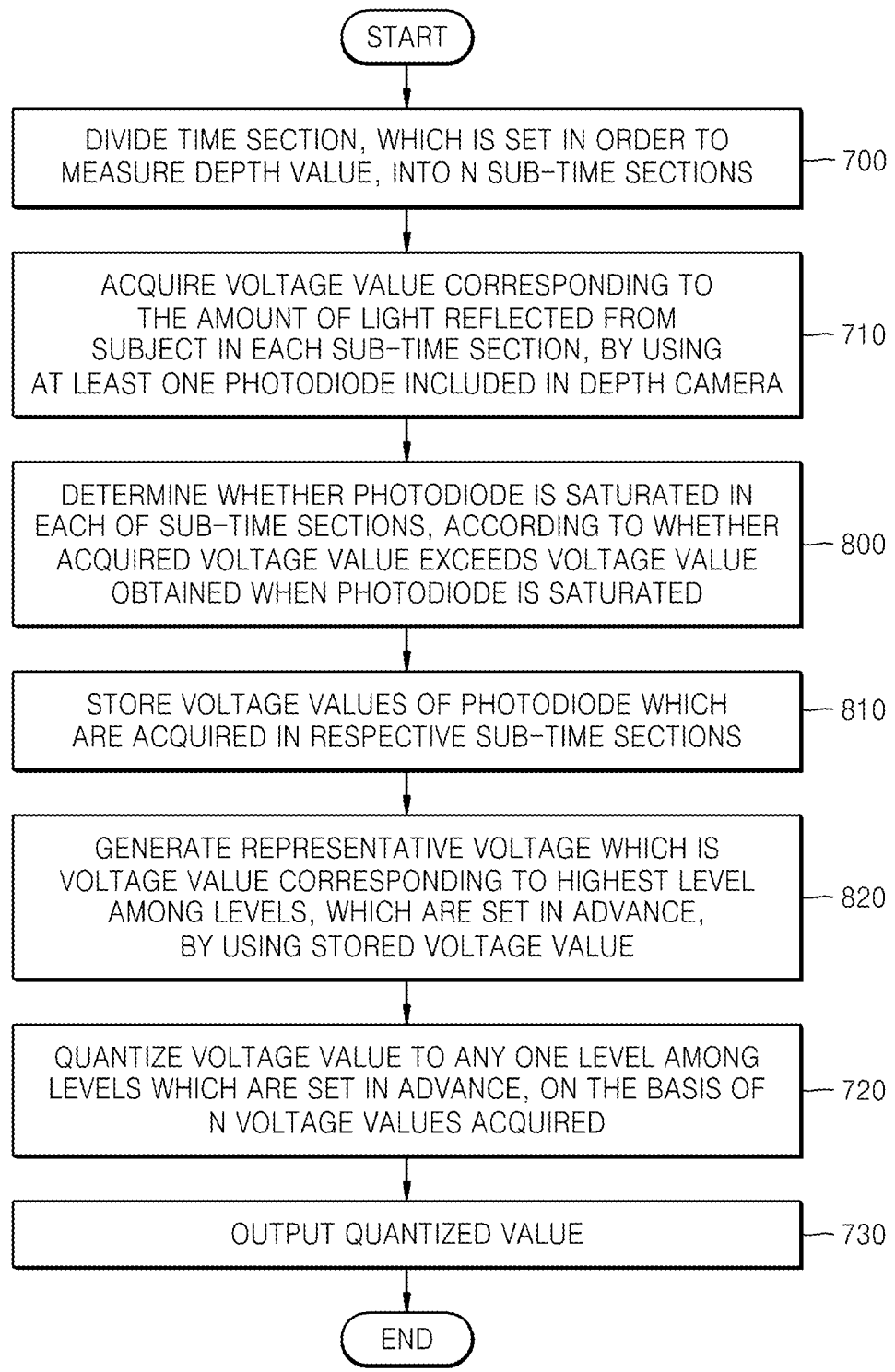
FIG. 8 is a flowchart showing an example of a method of generating a depth value according to an embodiment of the disclosure.

FIG. 8 is a flowchart showing an example in which a depth value is generated, according to an embodiment of the disclosure.

Referring to FIG. 8, the method of generating a depth value may be constituted by operations which are processed in a time-series manner by the apparatus 100 for generating a depth value which is shown in FIG. 4. Therefore, if the description below omits one or more details for the sake of brevity, it may be understood that the description of the apparatus 100 for generating a depth value which is shown in FIG. 4 may also be applied to the method of generating a depth value of FIG. 8.

Since operations 700 and 710 of FIG. 8 are operations which correspond to operations 700 and 710 of the method of generating a depth value which is shown in FIG. 7, respectively, a detailed description thereof will be omitted here.

In operation 800, the determination unit 400 may determine whether the photodiode 310 is saturated in each of the sub-time sections, according to whether an acquired voltage value exceeds the voltage value obtained when the photodiode 310 is saturated. The determination unit 400 may initialize the voltage value of the photodiode 310 on the basis of a result of the determination.

In operation 810, the storage unit 410 may store voltage values of the photodiode which are acquired in the respective sub-time sections. The storage unit 410 may store a difference value between the acquired voltage value and the initialized voltage value of the photodiode.

In operation 820, the representative voltage generation unit 420 may generate a representative voltage which is a voltage value corresponding to the highest level among predetermined levels, by using the stored voltage values. The predetermined levels refer to levels corresponding to a voltage value obtained, where the number of levels may be set by a user. The apparatus 100 for generating a depth value may determine whether the photodiode is saturated with respect to each of the n sub-time sections, may store the acquired voltage value, and may generate a representative voltage by using the stored voltage value.

In operation 720, the quantization unit 130 may quantize the voltage value to any one level among predetermined levels, on the basis of the n voltage values acquired. The quantization unit 130 may quantize the acquired voltage value to the predetermined level, by using the generated representative voltage.

In operation 730, the output unit 140 may output the quantized value, which may be used to obtain a depth value of an object.

Figure 9:
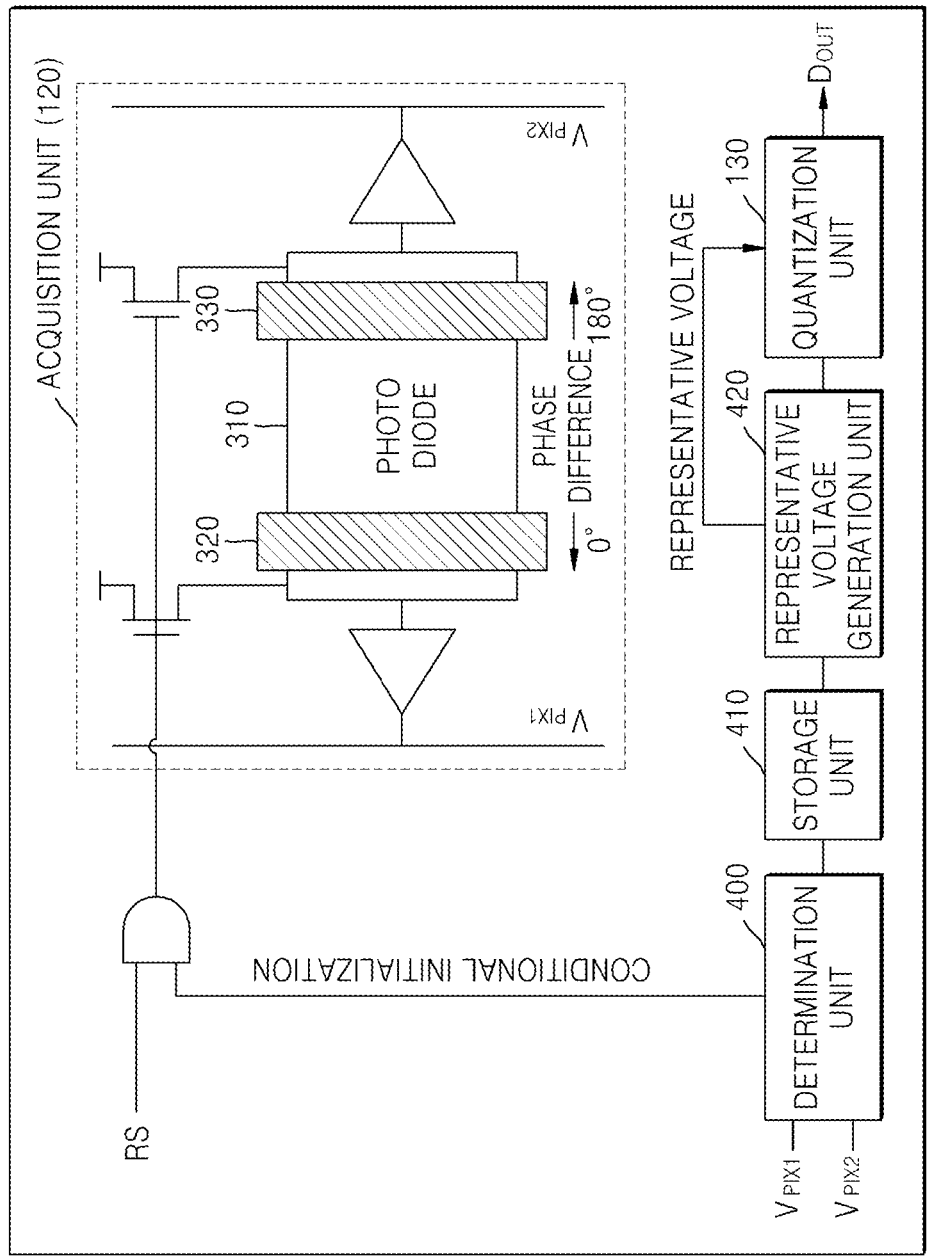
FIG. 9 is a configuration diagram showing an example of an apparatus for generating a depth value according to an embodiment of the disclosure.

FIG. 9 is a configuration diagram showing another example of an apparatus for generating a depth value, according to an embodiment of the disclosure. The acquisition unit 120 may include the photodiode 310. The photodiode 310 may include the first terminal 320 and the second terminal 330. The photodiode 310 may receive light reflected from a subject or object. The activation and the deactivation of the first terminal 320 or the second terminal 330 may be repeated with a certain cycle time.

For example, when the first terminal 320 is activated at a frequency of 20 Mhz, the second terminal 330 is deactivated. When the first terminal 320 is deactivated, the second terminal 330 may be activated. Accordingly, the first terminal 320 and the second terminal 330 may accumulate a charge amount with a phase difference of 180 degrees therebetween. When the first terminal 320 or the second terminal 330 is activated, a charge amount is accumulated through incident light. When the first terminal 320 or the second terminal 330 is deactivated, a charge amount may be bit accumulated through incident light.

The acquisition unit 120 may acquire a voltage value corresponding to the charge amounts which are acquired by the first terminal 320 and the second terminal 330. The determination unit 400 may determine whether the photodiode 310 is saturated, according to whether the acquired voltage value exceeds (or is equal to) the voltage value obtained when the photodiode 310 is saturated. When the photodiode 310 is saturated, the determination unit 400 may initialize the voltage value of the photodiode 310 on the basis of a result of the determination. The storage unit 410 may store the acquired voltage value of the photodiode 310. The storage unit 410 may include a correlated double sampling (CDS). The CDS may be constituted by a capacitor. The storage unit 410 may accumulate and store the acquired charge amount of the photodiode 310 in the capacitor. The representative voltage generation unit 420 may generate a representative voltage by using a voltage value corresponding to the charge amount accumulated in the capacitor. The acquisition unit 120, the determination unit 400, and the storage unit 410 may repeatedly operate during each of the sub-time sections which are divided by the division unit 110.

When the voltage value of the photodiode 310 is saturated, the apparatus 100 for generating a depth value may store the voltage value of the photodiode 310, and may initialize the charge amount of the photodiode 310 to thereby initialize the voltage value, and then may accumulate again the charge amount in the photodiode 310 during the next sub-time section to thereby acquire the voltage value. Accordingly, a range of the voltage value capable of being acquired is expanded, and thus a dynamic range of the apparatus 100 for generating a depth value is expanded.

For example, when the voltage value of the photodiode 310 is 100 mV in a case where a charge amount capable of being accumulated in the photodiode 310 is saturated and the amount of light which is incident during 10 ms is such an amount of light that the voltage value of the photodiode 310 is set to 200 mV, the acquisition unit 120 may acquire a voltage value of 100 mV which is a saturation voltage value of the photodiode 310 after 10 ms and may not acquire a voltage value with respect to the amount of light in which the voltage value is equal to or greater than 100 mV. However, when a time section is divided into four sub-time sections and a voltage value is acquired during 2.5 ms, the acquisition unit 120 acquires 50 mV as a voltage value of the photodiode 310 during a first sub-time section and acquires 100 mV as a voltage value of the photodiode 310 during a second sub-time section. The acquired 100 mV is stored in the storage unit 410, and then the voltage value of the photodiode 310 is initialized, and thus a voltage value is acquired again from 0 V. The acquisition unit 120 acquires a voltage value of 50 mV in a third sub-time section and acquires a voltage value of 100 mV in a fourth sub-time section. When the storage unit 410 stores a voltage value of 100 mV, a voltage value of 200 mV is stored in the storage unit 410 in total. Accordingly, since the voltage value capable of being acquired by the acquisition unit 120 increases from 100 mV to 200 mV, an effect of the expansion of a dynamic range is obtained.

The representative voltage generation unit 420 may generate a representative voltage which is a voltage value corresponding to the highest level among predetermined levels, by using the stored voltage value. For example, the total number of quantization levels may be set to 100, and a voltage value corresponding to the highest level may be 100 mV. Thus, for each of the quantization levels the voltage values range or change by 10 mV. For example, a voltage value of between 0 mV and 10 mV is a level 1, a voltage value of between 10 mV and 20 mV is a level 2, and so on. When the stored voltage value is 8.5 mV, the representative voltage generation unit 420 may generate a representative voltage of 10 mV. For example, the representative voltage generation unit 420 may generate a representative voltage based on the stored voltage value, e.g., by rounding to the nearest whole number, rounding to the next place value in base ten (e.g., a stored voltage value of 55.4 mV which has a left digit in the ten's place value, may correspond to or generate a representative voltage of 100 mV which has a left digit in the hundred's place value, and a stored voltage value of 8.5 mV which has a left digit in the one's place value, may correspond to or generate a representative voltage of 10 mV which has a left digit in the ten's place value), rounding to a number which is divisible by the number of quantization levels, etc. When the total number of quantization levels is 100 and a voltage value corresponding to the highest level is 100 mV, the quantization unit 130 may classify the voltage value of 8.5 mV as level 9. The level 9 is a level equivalent to a voltage value between 8 mV and 9 mV, and thus a quantization error is a maximum of 0.5 mV. When the representative voltage is used, the quantization unit 130 may maintain the same number of quantization levels (e.g., 100 quantization levels) as they are, and may replace a voltage value corresponding to the highest level with the representative voltage of 10 mV. Thus, the range of voltage values is changed from 0 mV to 10 mV, and when keeping the same number of levels (e.g., 100) for each of the quantization levels the voltage values range or change for each level by 0.1 mV. For example, a voltage value of between 0 mV and 0.1 mV is a level 1, a voltage value of between 0.1 mV and 0.2 mV is a level 2, and so on. In this case, when the voltage value is 8.5 mV, the quantization unit 130 classifies the voltage value as level 85. The level 85 is a level equivalent to a voltage value between 8.4 mV and 8.5 mV, and thus a quantization error is a maximum of 0.1 mV. Accordingly, when the quantization unit 130 performs quantization by using the representative voltage, the occurrence of the quantization error is reduced. The apparatus 100 for generating a depth value outputs a quantized value. The apparatus 100 for generating a depth value generates the depth value by using the quantized voltage value.

The embodiments of the disclosure can be written as one or more computer programs and can be implemented in general-use digital computers that execute the programs using a computer readable recording medium.

Examples of the computer readable recording medium may include magnetic storage media (e.g., ROM, floppy disks, hard disks, etc.), optical recording media (e.g., CD-ROMs, or DVDs), and storage media. Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

The apparatuses and methods according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor or any other device capable of responding to and executing instructions in a defined manner.

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the disclosure have been described with reference to the figures, it will be understood by those of ordinary skill in the art that various changes in form and details may be made therein without departing from the spirit and scope of the disclosure as defined by the following claims.

What is claimed is:

1. A method of generating a depth value corresponding to a subject by using a depth camera, the method comprising:
   irradiating the subject with light;
   dividing a desired time section into n sub-time sections to measure the depth value;

acquiring a voltage value corresponding to an amount of the light reflected from the subject in each sub-time section, by using at least one photodiode included in the depth camera;

quantizing the voltage value to any one level among a plurality of desired levels based on the acquired voltage values; and outputting the quantized value; wherein the voltage value comprises at least one of a first voltage value and a second voltage value which correspond to two respective terminals of the photodiode, and the acquiring of the voltage value comprises acquiring at least one of the first voltage value and the second voltage value in each of the sub-time sections.

2. The method of claim 1, further comprising:
determining whether the photodiode is saturated in each of the sub-time sections, according to whether the acquired voltage value exceeds a desired voltage value.

3. The method of claim 2, further comprising:
initializing the voltage value of the photodiode on the basis of a result of the determination.

4. The method of claim 2, further comprising:
storing the voltage values of the photodiode which are acquired in the respective sub-time sections.

5. The method of claim 4, further comprising:
generating a representative voltage which is a voltage value corresponding to a highest level among the desired levels, by using the stored voltage values,
wherein the quantizing of the voltage value comprises quantizing the acquired voltage value to the desired level, by using the generated representative voltage.

6. The method of claim 4, wherein the storing of the voltage values comprises storing a difference value between the acquired voltage value and an initialized voltage value of the photodiode.

7. The method of claim 1, wherein the acquiring of the voltage value comprises acquiring the first voltage value and the second voltage value in each sub-time section with a phase difference of 180 degrees between each sub-time section.

8. An apparatus for generating a depth value corresponding to a subject by using a depth camera, the apparatus comprising:
a light source configured to irradiate the subject with light;
a division calculator configured to divide a desired time section into n sub-time sections to measure the depth value;
a voltage acquirer configured to obtain a voltage value corresponding to an amount of the light reflected from the subject in each sub-time section, by using at least one photodiode included in the depth camera;
a quantizer configured to quantize the voltage value to any one level among desired levels, based on the obtained voltage values, and
an output device configured to output the quantized value, wherein
the voltage value obtained by the voltage acquirer comprises at least one of a first voltage value and a second voltage value which correspond to two respective terminals of the photodiode, and
the voltage acquirer is further configured to acquire at least one of the first voltage value and the second voltage value in each of the sub-time sections.

9. The apparatus of claim 8, further comprising a comparator configured to determine whether the photodiode is saturated in each of the sub-time sections, according to whether the acquired voltage value exceeds a desired voltage value.

10. The apparatus of claim 9, wherein the comparator is further configured to initialize the voltage value of the photodiode on the basis of a result of the determination.

11. The apparatus of claim 9, further comprising:
a storage configured to store the voltage values of the photodiode which are acquired in the respective sub-time sections.

12. The apparatus of claim 11, further comprising:
a representative voltage generator configured to generate a representative voltage which is a voltage value corresponding to a highest level among the desired levels, by using the stored voltage values,
wherein the quanitzer is configured to quantize the acquired voltage value to the desired level, by using the generated representative voltage.

13. The apparatus of claim 11, wherein the storage is configured to store a difference value between the acquired voltage value and an initialized voltage value of the photodiode.

14. The apparatus of claim 8, wherein the voltage acquirer is configured to acquire the first voltage value and the second voltage value in each sub-time section with a phase difference of 180 degrees between each sub-time section.

15. The apparatus of claim 8, wherein the photodiode comprises a pinned-photodiode (PPD).

16. A non-transitory computer readable recording medium having embodied thereon computer readable instructions, which when executed by at least one processor, executes the method of claim 1.

* * * * *